United States Patent

[11] 3,600,943

[72] Inventor Louis L. Blanchard
 Toledo, Ohio
[21] Appl. No. 844,562
[22] Filed July 24, 1969
[45] Patented Aug. 24, 1971
[73] Assignee William C. Blanchard
 a part interest

[54] FLOW MEASURING DEVICE
 12 Claims, 5 Drawing Figs.
[52] U.S. Cl. ............................................. 73/194
[51] Int. Cl. ............................................. G01f 1/02
[50] Field of Search ................................ 73/194,
 198; 222/30, 71, 23

[56] References Cited
 UNITED STATES PATENTS
 268,733 12/1882 Schmidt ..................... 73/194
 287,283 10/1883 Heinle ........................ 73/194

Primary Examiner—Richard C. Queisser
Assistant Examiner—Ellis J. Koch
Attorney—Lester L. Hallacher ABSTRACT: A device for measuring fluid flow, and particularly, liquid flow is described. The invention is constructed from a time-measuring mechanism. When the valve associated with the inventive device is changed in position to initiate the fluid flow the time mechanism begins to run. When the valve is returned to its off position the time measuring mechanism ceases running. Accordingly, the time lapsed while the valve is opened, as recorded by the time measuring mechanism, is indicative of the amount of fluid flow through the valve. Because the inventive device is dependent upon a lapse of time during which fluid flows the device must be calibrated for the particular system in which it is employed.

PATENTED AUG 24 1971 3,600,943

INVENTORS
LOUIS L. BLANCHARD
BY *Luther L. Gallagher*
ATTORNEY

FLOW MEASURING DEVICE

Many devices presently exist for measuring fluid flow through a valve or past a particular point. Although many of the existing devices are satisfactory for some purposes, they also suffer several inherent disadvantages. One major disadvantage is the necessity of allowing the fluid to flow through the measuring device. This results in the necessity of cleaning the measuring device on frequent occasions. Another disadvantage lies in the inability of the measuring device to record an accumulative total of fluid flow between several openings and closing of the valve. In most existing devices the fluid flow is measured and recorded while the fluid is flowing through the open valve, when the valve is closed the measuring device returns to zero. This is very disadvantageous for use where an accumulative total of fluid flow occasioned by numerous openings and closings is required.

Although the inventive device can be used in the measurement of virtually any fluid flow it will be desired in a particular environment in order to more clearly illustrate its various advantages. Accordingly, the invention is described in the environment of measuring beer flow. The inventive device is particularly advantageous in this usage because the fluid need not flow through the measuring device. Consequently, the steady, laminar flow of the beer is not disrupted and excessive foaming does not occur. Another advantage stems naturally from the absence of a fluid flow through the measuring device. Because beer is a beverage consumed by the general public a high degree of cleanliness is required of the dispensing equipment and premises. However, beer does not flow through the inventive measuring device and consequently it is free of contaminants and need not be removed and cleaned.

The inventive device is a time measuring device constructed such that it runs while a valve to which it is attached is open and does not run while the valve is closed. When it stops running it does not return to zero and consequently an accumulative total of bear flow over a lapsed period of time is recorded. Such a feature is useful in recording the amount of beer which has flown through a particular tap. A tavern owner can then easily keep records of the beer tapped and thereby maintain accurate records and verify the honesty of his employees.

It is therefore an object of this invention to provide a device for measuring fluid flow.

It is another object of this invention to provide such a device which does not require the fluid flow through the device.

It is another object to provide such a device which automatically starts and stops as the valve with which it is associated is opened and closed.

It is another object to provide such a device which records an accumulative total of fluid flow over a span of numerous openings and closing of the valve with which it is associated.

It is another object to provide such a device which measures fluid flow by recording the time during which the valve with which it is associated is open and correlating the total lapsed time with a known rate of flow.

Further objects, features, and advantages of the invention will become apparent from the following description and claims when read in view of the accompanying drawings wherein like numerals indicate like parts and in which:

Figure 5:
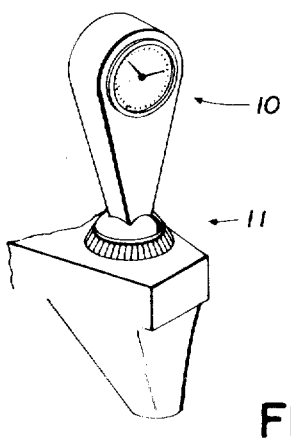
FIG. 5 shows the mounting of the invention on a beer tap and the recording face of the invention.

The preferred explanatory use of the invention can be best understood by referring to FIG. 5. In FIG. 5 a common beer tap 11 is shown with the inventive timing mechanism 10 mounted thereon. The timing mechanism 10 contains a pendulumlike member which prevents it from running when in the vertical position it assumes when the tap is closed. When the tap is opened by rotating it counterclockwise, as shown in FIG. 5, timer 10 is no longer vertical and therefore is free to run. Running continues until the tap is closed by returning it to the vertical position.

Figure 1:
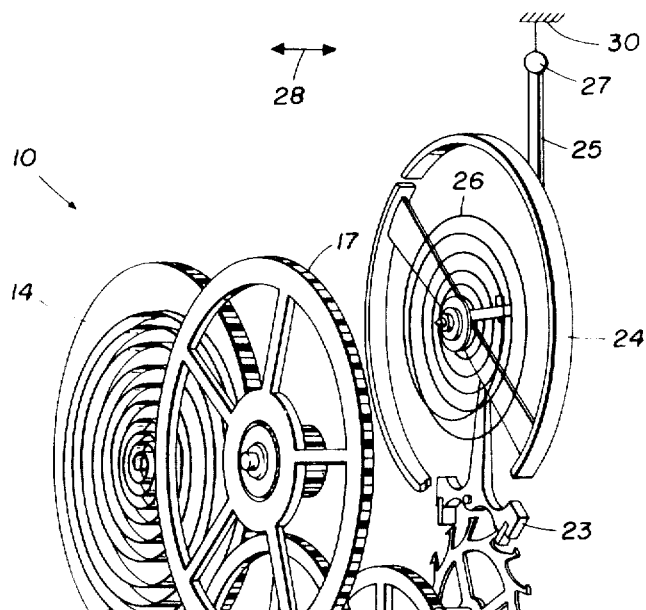
FIG. 1 shows a preferred embodiment of the invention and its cooperation with a timing mechanism.

FIG. 1 shows the details of the timing mechanism and the manner of making it sensitive to orientation changes occasioned by opening and closing of the tap 11. Before proceeding with a detailed description of the timing mechanism it should be understood that a large portion of the system is comprised of a common watch or clock mechanism. The timing mechanism 10 includes a mainspring 13 which is wound to thus serve as a motivating means in the same manner as a watch is wound. Mainspring 13 is used to drive a barrel 14 which is mechanically connected to said mainspring. Barrel 14 drives a center wheel 17 to which the hands (not shown) of the timing mechanism 10 are connected. Center wheel 17 is used to drive a third pinion 16 which in turn, drives a fourth pinion 18. Pinion 18 is connected to an escape pinion 19 through a fourth wheel 21. An escape wheel 22 is mechanically coupled to a pallet, fork and arbor 23 and thus these elements are driven by escape pinion 19. The pallet, fork and arbor combination drives a balance wheel 24 through a hairspring 26. The operation and cooperation of the elements thus far described is the same as that of a well-known watch mechanism and is fully described in U.S. Training Manual TM 9–1575. As is well known and stated in said Training Manual, the operation of the timing mechanism is dependent upon the free cyclic movement of balance wheel 24 which serves as a regulating means. When balance wheel 24 is free to oscillate, the timing mechanism is operative and the hands it drives can move. If its oscillatory movement is inhibited, the hands are also inhibited from moving. The invention is used to measure fluid flow by inhibiting the movement of balance wheel 24.

The oscillatory motion of balance wheel 24 is inhibited by the use of a pendulum 25, as generally indicated in FIG. 1. Pendulum 25 is mechanically fastened to the case of the timing mechanism as generally indicated by reference number 30. A pivot 27 is provided to permit pendulum 25 to swing from its contact with balance wheel 24. The pivot axis of pendulum 25 is perpendicular to the axis of rotation of balance wheel 24. Consequently, the timing mechanism, in this embodiment, must be mounted for rotation about the planar surface of balance wheel 24, as indicated by arrow 28.

Pendulum 25 is positioned with respect to balance wheel 24 such that it rests against said wheel when the plane of the mechanism is vertical. As described hereinabove this inhibits motion of balance wheel 24 and causes a cessation of running of the timing mechanism. In this position the tap is closed and no fluid is flowing. When the tap is opened, by clockwise rotation as shown in the figure, fluid begins to flow. Simultaneously, pendulum 25 remains vertically oriented and therefore no longer contacts balance wheel 24. Freedom from contact with pendulum 25 permits balance wheel 24 to oscillate and an output reading is produced by the timing mechanism.

An example of the output indicator can be seen by viewing a common watch or clock having a second hand. As is well known seconds, minutes, and hours are related by a factor of 60. Accordingly, by knowing the fluid flow per second the face of the mechanism can be directly calibrated in volume of flow.

Tests conducted with a tap having a standard orifice for commercial usage show that it takes 7 seconds to tap 14 ounces of fluid under 8 pounds of pressure. The rate of flow is therefore 2 ounces per second in such a system. Obviously, this is 120 ounces per minute or 62 seconds per gallon. The dial can therefore be calibrated to read volume directly. Also, by utilizing the 60 ratio between three hands of the timing mechanism an accumulative total over a long period of time can be realized. In order to prevent unwanted resetting of the indicator stem can be removed. In such an instant a self-winding watch can be used, or alternatively a removable stem can be used.

It should also be noted that the gear ratio can be changed so that the 60 ratio is reduced to 10. This would simplify the readout dial, but obviously is not necessary.

The need for calibration for a particular fluid system is not a significant disadvantage because commercial beer tapping systems are standardized on a pressure of 8 p.s.i. Furthermore, the ease of calibration of the dial further reduced any possible objection to the necessity of individual calibration.

It should also be understood that the face of the watch or clock can be used without alternation or modification. In such a usage the readout is in time the tap was open. The total accumulated time can then be correlated to fluid flow by reference to a scale, chart, or calculator calibrated to the system.

Figure 2:
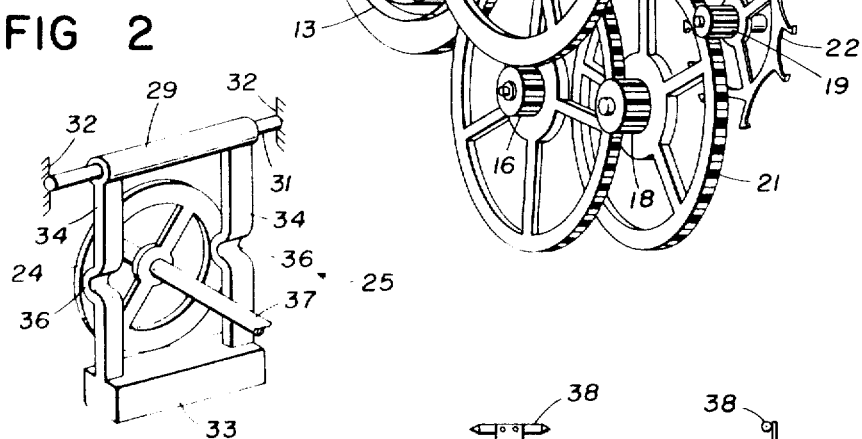
FIG. 2 shows a second preferred embodiment of the instant invention.

FIG. 2 shows a preferred configuration for pendulum 25. The pendulum includes cylindrical portion 29 which is free to rotate about an axis 31. Both ends of axis 31 are immovably connected to the case of the timing mechanism, as indicated as 32. A high inertial portion 33 is connected to cylinder 29 by rigid connecting arms 34. Each of arms 34 contains a dimple 36, which rests against balance wheel 24. It should be noted that axis 31 of pendulum 25 and axis 37 of balance wheel 24 are perpendicular. Accordingly, when the timing mechanism is vertically oriented dimples 36 physically contact balance wheel 24 and prevent any rotation thereof. When the tap is opened and the vertical orientation is changed the pendulum 25 no longer contacts balance wheel 24 and movement thereof can occur.

One additional feature of balance wheel 24 must also be considered. Because the motion of the wheel is oscillatory there is an instant between each change of direction when the motion ceases. If pendulum 25 first comes into contact with wheel 24 at one of these instances, the wheel will be in a balanced rest position. Consequently, disengagement of the pendulum from the wheel will not result in a resumption of motion. Although such an occurrence is unlikely for a particular closing of the tap, the probability over a large number of openings and closings is significant.

This difficulty can be overcome in the FIG. 2 embodiment by placing a very small spring having a low force constant on each of dimples 36. Such springs must be located such that contact between the dimples 36 and wheel 24 is made through the springs. The two springs must act in different directions on the wheel. For example, the left one upwardly and the right one downwardly, resulting a clockwise force on the wheel 24 as the pendulum 25 leaves contact therewith. The small net force with kick wheel 24 off the balanced position. In the usual case where wheel 24 is not on the balance position the small force will act either with or against the natural motion of the wheel, either of these actions will permit the resumption of motion of the balance wheel.

Figures 3, 4:
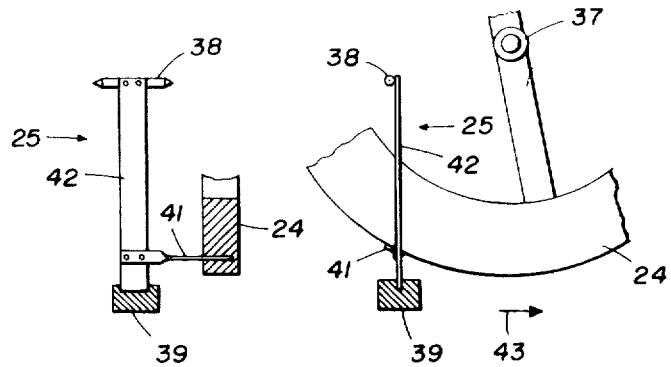
FIG. 3 shows a side view of a third preferred embodiment of the instant invention.
FIG. 4 shows a front view of the embodiment of FIG. 3.

FIGS. 3 and 4 show another preferred embodiment for the invention. In this embodiment pendulum 25 is orientated such that its pivot axis 38 is parallel to the axis of rotation 37 of balance wheel 24. Pendulum 25 includes a weighted portion 39 which causes the pendulum to normally assume a vertical position. Located in the proximity of weight 39 is a spring 41 which is rigidly fastened to arm 42. Arm 42 is substantially rigid and connects axis 38 to weight 39.

The axis 38 of pendulum 25 does not coincide with axis 37 of balance wheel 24. Also pendulum 25 has a length which is less than the radius of balance wheel 24. Consequently, when the tap upon which the measuring device is mounted is in the vertical position spring 41 rests against balance wheel 24. The spring is therefore slightly deformed and accordingly applies a small force to the balance wheel. Motion of balance wheel 24 is accordingly inhibited when the tap is in the vertical or closed position. When the tap is opened, balance wheel 24 moves in the direction of arrow 43 and travels away from spring 41. As spring 41 and wheel 24 separate the spring applies a small force to the wheel and therefore prevents its "hanging up" in the balance position.

The action of spring 41 illustrated in FIGS. 3 and 4 required that the timing mechanism be mounted such that the plane of wheel 24 is parallel to the plane in which the tap moves. In FIG. 4 this plane is the plane of the paper. The face of the timing mechanism can be oriented perpendicular to the motion of the tap simply by rotating the axis 38 of pendulum 25, 90°. Obviously spring 41 must be rotated 90° on arm 42. With such an arrangement spring 41 will apply a small upward force to wheel 24 and prevent a balanced position thereof.

The embodiments thus far described are useful in retarding the motion of timing mechanisms which are mechanically driven. A similar principle can be used to retard electrically driven timing mechanisms. In such an arrangement weight 33 or 39 will be used to close a switch connected into the electrical circuit which drives the timing mechanism. When a vertical orientation is disturbed, the switch is closed and the timing mechanism becomes operative. The switch is opened when the tap is returned to a vertical position and the timing mechanism ceases to run.

Although this invention has been described with respect to particular embodiments thereof, it is not to be so limited as changes and modifications can be made within the scope of the invention as defined by the appended claims.

1. An orientation sensitive flow measuring mechanism, said mechanism being provided with means for mounting on a tap so that said mechanism is angularly tilted when said tap is open and substantially vertical when said tap is closed, said mechanism including a timing mechanism having a motivating means and regulating means and means for inhibiting movement of said regulating means in response to orientation changes of said measuring mechanism so that said timing mechanism runs when said tap is open and is inhibited from running when said tap is closed.

2. The flow measuring mechanism of claim 1 wherein said means for inhibiting movement includes a pendulumlike member, said pendulumlike member being positioned in the proximity of said motivating means and regulating means so that said pendulum and said regulating means physically contact during said substantially vertical orientation of said measuring mechanism and are physically separate when said measuring mechanism is in said tilted orientation.

3. The measuring mechanism of claim 2 wherein said regulating means oscillates about an axis of rotation when said mechanism is moved away from said vertical orientation; and said pendulum has an axis of rotation which is perpendicular to said axis of said regulating means and parallel to the direction of said angular tilt.

4. The measuring mechanism of claim 3 wherein said pendulum includes at least one rigid support arm and a weighted portion; said weighted portion increasing the sensitivity of said mechanism to orientation changes; and said support arm includes a dimpled portion which rests against said regulating means when said measuring mechanism is in said one orientation.

5. The measuring mechanism of claim 2 wherein said regulating means oscillates about an axis of rotation when said mechanism is moved away from said vertical orientation; and said pendulum has an axis of rotation which is parallel to said axis of said regulating means.

6. The mechanism of claim 1 wherein said motivating means includes an electrical circuit having a switch and said means for inhibiting includes an orientation sensitive member which opens and closes said switch in response to changes in orientation changes of said measuring mechanism.

7. An orientation sensitive flow measuring mechanism including a timing mechanism having a balance wheel and means for inhibiting movement of said balance wheel in response to orientation changes of said measuring mechanism; said means for inhibiting movement including a pendulumlike member, said pendulumlike member being positioned in the proximity of said balance wheel so that said pendulum and said balance wheel physically contact during one orientation of said measuring mechanism and are physically separate when said measuring mechanism is moved from said one orientation; said balance wheel oscillating about an axis of rotation when said mechanism is moved away from one orientation; and said pendulum having an axis of rotation which is perpendicular to said axis of said balance wheel and parallel to the plane of said balance wheel; said pendulum including at least one rigid support arm and a weighted portion; said weighted portion increasing the sensitivity of said mechanism to orientation changes; and said support arm including a dimpled portion which rests against said balance wheel when said measuring mechanism is in said one orientation; said pendulum further including a resilient member positioned on said dimpled portion so that resilient member applies a small force to said regulating member as contact between said balance wheel and said pendulum is broken.

8. An orientation sensitive flow measuring mechanism including a timing mechanism having a motivating means and a regulating means comprising: means for inhibiting movement of said regulating means in response to orientation changes of said measuring mechanism, said regulating means oscillating about an axis of rotation when said mechanism is moved away from said one orientation; and said pendulum has an axis of rotation which is parallel to said axis of said regulating member; said pendulum including a rigid support arm and a weighted portion; and a resilient member supported by said rigid member; said resilient member acting on the rim of said regulating member when said measuring mechanism is in said one orientation.

9. The mechanism of claim 8 wherein said axis of rotation of said pendulum is positioned away from the axis of rotation of said regulating means so that said resilient member moves against and away from the rim of said regulating means as the orientation of said measuring mechanism is changed.

10. An orientation sensitive flow measuring mechanism including a timing mechanism having a motivating means and a balance wheel comprising: means for inhibiting movement of said balance wheel in response to orientation changes of said measuring mechanism; said means for inhibiting movement including a pendulumlike member, said pendulumlike member being positioned in the proximity of said balance wheel so that said pendulum and said balance wheel physically contact during one orientation of said measuring mechanism and are physically separate when said measuring mechanism is moved from said one orientation; said pendulumlike member including a resilient member which acts against said balance wheel when said mechanism is in said one orientation.

11. An orientation sensitive flow measuring mechanism, said mechanism being constructed for mounting on a fluid tap so that said mechanism is rotated about a first axis as said tap is opened and closed; said measuring mechanism comprising:
a timing mechanism having a regulating member, said regulating member angularly moving about a second axis perpendicular to said first axis;
a pendulum in the proximity of said regulating member, said pendulum being mounted for movement in response to rotation about said first axis, said pendulum resting against said regulating member to prevent movement of said regulating member when said tap is closed and said pendulum swinging away from said regulating member when said tap is opened so that said timing mechanism operates and the time recorded is indicative of the flow of fluid through said tap.

12. The mechanism of claim 11 wherein said pendulum is mounted for rotation about an axis parallel to said first axis but is rigidly mounted with respect to rotation about said second axis.